US012018438B2

(12) United States Patent
Schuh et al.

(10) Patent No.: US 12,018,438 B2
(45) Date of Patent: *Jun. 25, 2024

(54) EMBOSSING PATTERN WITH A CONTINUOUS CONTOUR PLATEAU HAVING EMBOSS ELEMENTS THEREON AND PRODUCTS AND METHODS OF USING THE SAME

(71) Applicant: GPCP IP Holdings LLC, Atlanta, GA (US)

(72) Inventors: Brian J. Schuh, Appleton, WI (US); Steven R. Olson, Madison, WI (US); Peter G. Anderson, DePere, WI (US); Luke J. Van den Plas, Green Bay, WI (US); Michael D. Wishneski, Oconto, WI (US)

(73) Assignee: GPCP IP Holdings LLC, Atlanta, GA (US)

( * ) Notice: Subject to any disclaimer, the term of this patent is extended or adjusted under 35 U.S.C. 154(b) by 163 days.

This patent is subject to a terminal disclaimer.

(21) Appl. No.: 17/552,635

(22) Filed: Dec. 16, 2021

(65) Prior Publication Data

US 2022/0112665 A1 Apr. 14, 2022

Related U.S. Application Data

(62) Division of application No. 16/037,114, filed on Jul. 17, 2018, now Pat. No. 11,248,347.

(Continued)

(51) Int. Cl.

*D21H 27/40* (2006.01)
*B31F 1/07* (2006.01)

(Continued)

(52) U.S. Cl.

CPC ............... *D21H 27/40* (2013.01); *B31F 1/07* (2013.01); *D21H 27/002* (2013.01);

(Continued)

(58) Field of Classification Search

CPC ..... Y10T 428/24628; Y10T 428/24669; Y10T 428/24686; Y10T 428/24694; Y10T 428/24702; Y10T 428/24711; Y10T 428/24736; Y10T 428/31971; Y10T 428/31993; Y10S 428/906; B32B 3/00; B32B 3/26; B32B 3/28; B32B 3/30; B32B 29/00; B32B 29/002; B32B 29/005; D21H 27/00; D21H 27/02; D21H 27/30; D21H 27/40; B31F 1/00; B31F 1/07

USPC ....... 428/174, 179, 181, 182, 183, 184, 185, 428/186, 187, 532, 537.5, 906; 162/100, 162/109, 116, 123, 231

See application file for complete search history.

(56) References Cited

U.S. PATENT DOCUMENTS

D92,056 S 4/1934 Aemisegger
D124,575 S 1/1941 Schwartz (Continued)

*Primary Examiner* — Maria V Ewald
*Assistant Examiner* — Ethan A. Utt

(57) ABSTRACT

Embossed tissue products having improved strength and softness are disclosed. The products as described have a continuous curvilinear emboss element which carries discrete emboss elements, thereby providing the product with the softness and handfeel benefits associated with the long linear elements, but the visual appearance of discrete emboss elements.

16 Claims, 17 Drawing Sheets

Related U.S. Application Data

(60) Provisional application No. 62/534,011, filed on Jul. 18, 2017.

(51) Int. Cl.

*D21H 27/00* (2006.01)
*D21H 27/02* (2006.01)
*D21H 27/30* (2006.01)

(52) U.S. Cl.

CPC ............. *D21H 27/02* (2013.01); *D21H 27/30* (2013.01); *B31F 2201/0733* (2013.01); *B31F 2201/0738* (2013.01); *B31F 2201/0787* (2013.01)

(56) References Cited

U.S. PATENT DOCUMENTS

| | | | | | |
|---|---|---|---|---|---|
| D125,040 | S | | 2/1941 | Sylvia | |
| D129,959 | S | | 10/1941 | Christen | |
| D179,703 | S | | 2/1957 | Sadinoff | |
| D186,261 | S | | 10/1959 | Ostwald | |
| 3,868,205 | A | * | 2/1975 | Thomas ................. | D21H 27/40 425/363 |
| D268,961 | S | | 5/1983 | Erickson | |
| 5,106,457 | A | | 4/1992 | Manning | |
| 5,573,830 | A | | 11/1996 | Schulz | |
| D407,225 | S | | 3/1999 | Dwiggins | |
| D411,369 | S | | 6/1999 | Burr | |
| D418,306 | S | | 1/2000 | Burr | |
| 6,017,418 | A | | 1/2000 | Oriaran et al. | |
| D420,808 | S | | 2/2000 | Dwiggins | |
| 6,033,761 | A | | 3/2000 | Dwiggins et al. | |
| D422,416 | S | | 4/2000 | Schulz | |
| D426,709 | S | | 6/2000 | Latchoo | |
| 6,153,053 | A | | 11/2000 | Harper et al. | |
| 6,165,319 | A | | 12/2000 | Heath et al. | |
| 6,277,467 | B1 | | 8/2001 | Dwiggins et al. | |
| D450,934 | S | | 11/2001 | Duritsch | |
| 6,334,931 | B1 | | 1/2002 | Dwiggins et al. | |
| 6,419,790 | B1 | | 7/2002 | Leege et al. | |
| D463,138 | S | | 9/2002 | Cohen | |
| 6,461,720 | B1 | | 10/2002 | Graff | |
| 6,468,392 | B2 | | 10/2002 | Oriarian et al. | |
| 6,524,683 | B1 | | 2/2003 | Roussel et al. | |
| D521,250 | S | | 5/2006 | Knobloch | |
| D563,240 | S | | 3/2008 | Robinson | |
| 7,413,630 | B2 | | 8/2008 | Graff | |
| D582,164 | S | | 12/2008 | Mark | |
| D587,461 | S | | 3/2009 | Lelandais | |
| 7,744,723 | B2 | | 6/2010 | Sheehan | |
| D618,920 | S | | 7/2010 | Wiwi | |
| D633,723 | S | | 3/2011 | Vidal | |
| D636,609 | S | | 4/2011 | Coffaro | |
| D640,064 | S | | 6/2011 | Horn | |
| 8,097,322 | B1 | | 1/2012 | Osorio | |
| D660,012 | S | | 5/2012 | Enderby | |
| D660,013 | S | | 5/2012 | Tardif | |
| D688,879 | S | | 9/2013 | Olson | |
| D695,022 | S | | 12/2013 | Olson | |
| D738,635 | S | | 9/2015 | Seitzinger | |
| D740,570 | S | | 10/2015 | Seitzinger | |
| D764,811 | S | | 8/2016 | Schuller | |
| D807,044 | S | | 1/2018 | Azeredo | |
| D811,128 | S | | 2/2018 | Bell | |
| 11,248,347 | B2 | * | 2/2022 | Schuh .................. | D21H 27/002 |
| 2006/0286885 | A1 | | 12/2006 | Schuh | |
| 2009/0117334 | A1 | | 5/2009 | Sogard | |
| 2009/0297781 | A1 | | 12/2009 | Huss et al. | |
| 2013/0024253 | A1 | | 1/2013 | Silverman | |
| 2017/0181276 | A1 | | 6/2017 | Sawada | |
| 2017/0320105 | A1 | | 11/2017 | Roozrokh | |

* cited by examiner

EMBOSSING PATTERN WITH A CONTINUOUS CONTOUR PLATEAU HAVING EMBOSS ELEMENTS THEREON AND PRODUCTS AND METHODS OF USING THE SAME

CROSS-REFERENCE TO RELATED APPLICATIONS

This application is a division of copending U.S. patent application Ser. No. 16/037,114, filed Jul. 17, 2018, which claims the benefit of U.S. Provisional Patent Application No. 62/534,011 filed Jul. 18, 2017, which are incorporated by reference herein in their entireties.

The present disclosure relates to a tissue product having improved softness and handfeel. More particularly, the present disclosure relates to a tissue product bearing an emboss pattern comprising continuous linear or curvilinear embossing elements thereby improving the handfeel of the product by reducing the knobbiness that is generally found with discontinuous dot- or dash-type embossing elements. The tissue product as described can have the look of discontinuous embossing elements with the softness advantages associated with continuous emboss elements. According to one embodiment, the present disclosure relates to a tissue product having improved emboss definition by reducing bunching at the intersection of emboss elements. According to another embodiment, the tissue product comprises an embossing pattern, the emboss pattern comprising at least one continuous, linear or curvilinear embossing element, and a set of discontinuous embossing elements that project from the top of the continuous embossing element where the sidewalls of the discontinuous elements are coplanar with the sidewalls of the continuous embossing element.

The consumer's daily life is filled with a variety of modern products that are produced solely for the comfort and convenience of the consumer. Absorbent paper products are ubiquitous in modern society. U.S. consumers purchase tens of billions of dollars' worth of absorbent tissue products each year. Absorbent products take a variety of typical forms, for example, paper towel, toilet tissue, napkins, wipers and the like. Absorbent products are generally produced as one or more tissue sheets that are, in appropriate products, bonded to one another to improve the absorbency of the finished product.

Absorbent paper products are generally differentiated by cost and use. For example, tissue and towel may be divided by industrial uses and consumer uses. Within each category, there are differing qualities of tissue based upon the purchaser's desire. As the price of the product increases, product attributes such as thickness, absorbency, softness, and aesthetics all improve. In the area of home use consumer tissue and towel products, small differences in product attributes can be the difference between a successful product and an unsuccessful product.

Consumer acceptance of absorbent tissue products, is heavily influenced by the perceived softness of the tissue product, particularly in the area of premium products. Most consumers understand that available premium products have the necessary strength and absorbency to fulfill their intended purpose. Consumers often look to more superficial attributes, e.g. aesthetics, to make purchase decisions. Indeed, the consumer's perception of the desirability of one tissue product over another is often based, in significant respects, on the perceived relative softness of the tissue product. The tissue product that is perceived to be softest is typically perceived to be the most acceptable.

Thus, tissue producers strive to create commercial absorbent products that possess a relatively high degree of perceived puffiness and softness. Product attributes are imparted to an absorbent product both during the production of the tissue sheet and during the converting operations that are used to produce the final product. Emboss definition, bulk and handfeel of the tissue paper are commonly found to affect the perceived softness of the absorbent product.

The present disclosure provides for a tissue product having strength retention and having improved emboss definition, softness and handfeel. The emboss pattern used to produce the product has the look of well-defined discontinuous elements and the advantages of a softer continuous base element to achieve both better definition and better softness. The emboss pattern also simplifies the addition of adhesive to the sheet allowing lower adhesive levels to achieve satisfactory ply-bonding while retaining softness.

SUMMARY OF THE DISCLOSURE

The present disclosure relates to an embossing roll comprising, at least one continuous linear or curvilinear emboss element having a long dimension and a short dimension, the continuous emboss element having a base and a top, wherein the height of the element is measured from the base to the top, and the length and width are measured across the base in the long dimension and the short dimension, respectively. The continuous emboss element includes a set of discontinuous emboss elements that project upward from the top of the continuous emboss element, wherein the length and width of the discrete emboss elements do not exceed the width and length dimension of the continuous emboss elements.

In one embodiment, the present disclosure relates to an embossed tissue product comprising, an emboss pattern comprising, at least one continuous linear or curvilinear emboss element having a long dimension and a short dimension, the continuous emboss element having a base and a top, wherein the height of the element is measured from the base to the top, and the length and width are measured across the base in the long dimension and the short dimension, respectively. The continuous emboss element includes a set of discontinuous emboss elements that project upward from the top of the continuous emboss element, wherein the width of the discrete emboss elements are co-planar with the width of the continuous emboss element.

According to another embodiment, the disclosure relates to an embossed paper product comprising, at least one ply of tissue having two sides and comprising an emboss pattern, wherein the embossed paper ply exhibits a series of discrete emboss elements on one side, and wherein the embossed paper ply exhibits one or more continuous linear embossments on the other side.

According to yet another embodiment, the disclosure relates to a method for making a tissue or towel product comprising, obtaining at least two base sheets, embossing the base sheets with an emboss pattern comprising at least one continuous linear or curvilinear emboss element and comprising a set of discontinuous emboss elements that have coextensive side walls with the continuous linear or curvilinear emboss element, and plying the base sheets Additional advantages of the described methods and products will be set forth in part in the description which follows, and in part will be obvious from the description, or may be learned by practice of the disclosure. The advantages of the disclosure will be realized and attained by means of the elements and combinations particularly pointed out in the appended claims.

It is to be understood that both the foregoing general description and the following detailed description are exemplary and explanatory only and are not restrictive of the invention, as claimed. The accompanying drawings, which are incorporated in and constitute a part of this specification, illustrate several embodiments and together with the description, serve to explain the principles of the disclosure.

BRIEF DESCRIPTION OF THE DRAWINGS

FIG. 12, illustrates a cross-section of the emboss pattern of FIG. 13 at section line B-B.

DESCRIPTION

Figure 1:
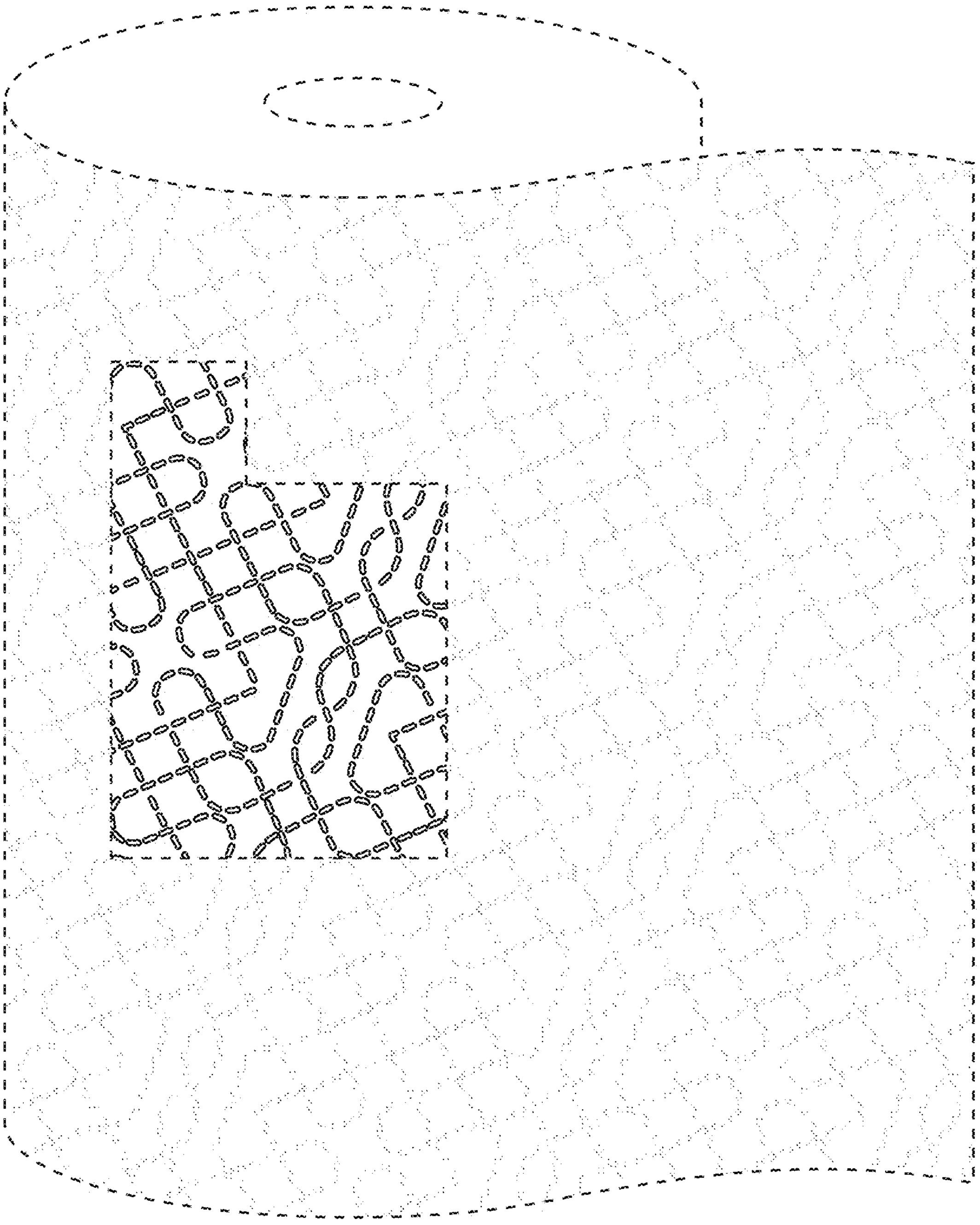
FIG. 1 illustrates a roll of tissue bearing a stitch-based emboss pattern according to one embodiment of the present description.

Reference will now be made in detail to certain exemplary embodiments, examples of which are illustrated in the accompanying drawings. Wherever possible, the same reference numbers will be used throughout the drawings to refer to the same or like items.

The present disclosure relates to an embossed paper product that exhibits a series of discontinuous emboss elements while retaining the advantages, e.g., strength and softness, associated with a long continuous linear embossment. The use of the continuous curvilinear base allows the emboss pattern to include embossments that heretofore, may have been too knobby or rough to be used on premium tissue products. While the advantages associated with the tissue products are described in relation to individual embodiments, the product can have any combination of those advantages, regardless of whether that product attribute was specifically described with respect to the particular embodiment.

As used herein "web," "sheet," "tissue," "nascent web," "tissue product," "base sheet" or "tissue sheet," can be used interchangeably to refer to the fibrous web during various stages of its development. Nascent web, for example, refers to the embryonic web that is deposited on the forming wire. Once the web achieves about 30% solids content, it is referred to as a tissue or a sheet or a web. Post production, the single-ply of tissue is called a base sheet. The base sheet may be combined with other base sheets to form a tissue product or a multi-ply product.

The base sheet for use in the products of the present disclosure may be made from any art recognized fibers. Papermaking fibers used to form the absorbent products of the present disclosure include cellulosic fibers, commonly referred to as wood fibers. Specifically, the base sheet of the disclosure can be produced from hardwood (angiosperms or deciduous trees) or softwood (gymnosperms or coniferous trees) fibers, and any combination thereof. Hardwood fibers include, but are not limited to maple, birch, aspen and *eucalyptus*. Hardwood fibers generally have a fiber length of about 2.0 mm or less. Softwood fiber includes spruce and pine, and exhibit an average fiber length of about 2.5 mm. Cellulosic fibers from diverse material origins may also be used to form the web of the present disclosure. The web of the present disclosure may also include recycled or secondary fiber. The products of the present disclosure can also include synthetic fibers as desired for the end product.

Papermaking fibers can be liberated from their source material by any one of the number of chemical pulping processes familiar to one experienced in the art including sulfate, sulfite, polysulfite, soda pulping, etc. The pulp can be bleached as desired by chemical means including the use of chlorine, chlorine dioxide, oxygen, etc. Alternatively, the papermaking fibers can be liberated from source material by any one of a number of mechanical/chemical pulping processes familiar to anyone experienced in the art including mechanical pulping, thermomechanical pulping, and chemi-thermomechanical pulping. These mechanical pulps can be bleached, if one wishes, by a number of familiar bleaching schemes including alkaline peroxide and ozone bleaching.

The fiber is fed into a headbox where it will be admixed with water and chemical additives, as appropriate, before being deposited on the forming wire. The chemical additives for use in the formation of the base sheets can be any known combination of papermaking chemicals. Such chemistry is readily understood by the skilled artisan and its selection will depend upon the type of end product that one is making. The method used in the instant disclosure to improve sheet softness and definition should achieve the described results regardless of what specific chemistry is used. Papermaking chemicals include, for example, strength agents, softeners and debonders, creping modifiers, sizing agents, optical brightening agents, retention agents, and the like.

A first nascent web is formed from the pulp. The web can be formed using any of the standard equipment known to the skilled artisan, e.g., crescent former, suction breast roll, twin-wire former, etc. The web is transferred from the forming wire to a fabric for non-compactive, e.g., vacuum suction, or limited compactive dewatering. Thereafter, the partially dewatered web is dried without compression by passing hot air through the web while it is supported by the fabric.

The web is then calendered and rolled to await converting. Converting refers to the process that changes or converts base sheets into final products. Typical converting in the area of tissue and towel includes embossing, perforating, and plying.

Described herein is an embossed paper product and a method of making that paper product. The embossing pattern has specific aspects that cause the final products to have a unique paper deformation that results in superior softness and handfeel. The embossing as described delivers a cleaner more defined emboss pattern than heretofore. Furthermore, the arrangement of the embossing elements causes the product to have a lower coefficient of friction (GMMMD) on the reverse side.

The products as described herein may be produced using any art recognized embossing method. The base sheets as described can be embossed and laminated in a traditional rigid-resilient fashion.

FIG. 1 is an illustration of a rolled paper product bearing one embodiment of the emboss pattern as described herein. According to this embodiment, the pattern is produced from a curvilinear embossing element bearing a series of discontinuous embossing elements. According to this embodiment, the discontinuous embossing elements are dashes and the embossing pattern appears as a series of dashes. In this embodiment, the discontinuous elements appear as dashes on one side of the sheet and as a single linear emboss element on the other side of the sheet. While the pattern has been described with respect to a single linear emboss element on the reverse side of the pattern, the skilled artisan would readily recognize that the single element could be split one or more times without departing from the spirit and scope of the invention.

Figure 2:
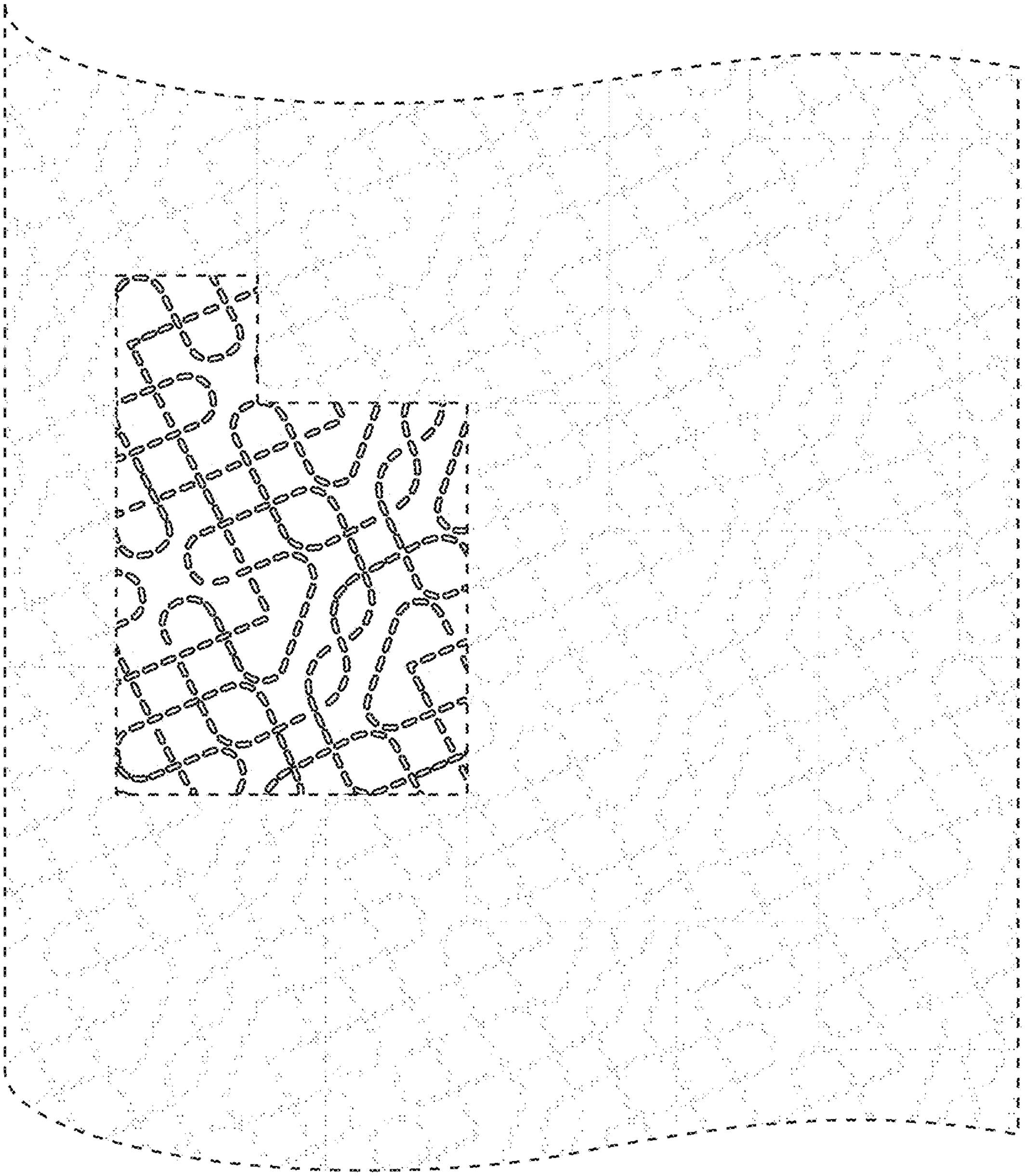
FIG. 2 illustrates a flat sheet of tissue product bearing a stitch-based emboss pattern according to the present description.

FIG. 2 illustrates a single sheet of paper product bearing the same illustrated pattern as seen in FIG. 1. FIGS. 1 and 2, include an enlarged illustration of a single repeat unit of this embodiment of the emboss pattern from the perspective of the exposed ply of the paper product.

Figure 3:
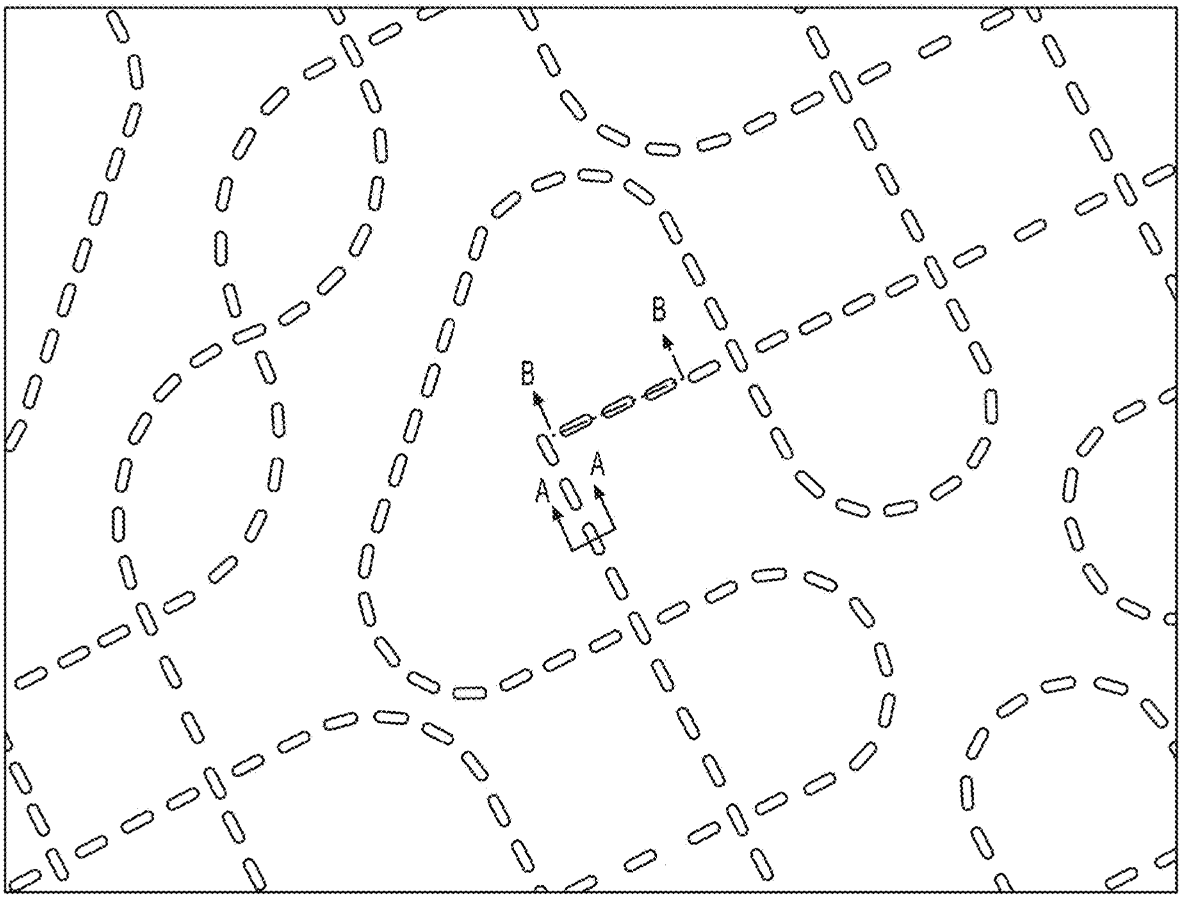
FIG. 3 illustrates a fragment of a stitch-based emboss pattern according to the present description.

FIG. 3 is an expanded view of the emboss pattern as seen in FIGS. 1 and 2. The lines at A-A and B-B show a cross-section of the emboss element of this embodiment, across the width and along the length of the curvilinear element, respectively.

Figure 4:
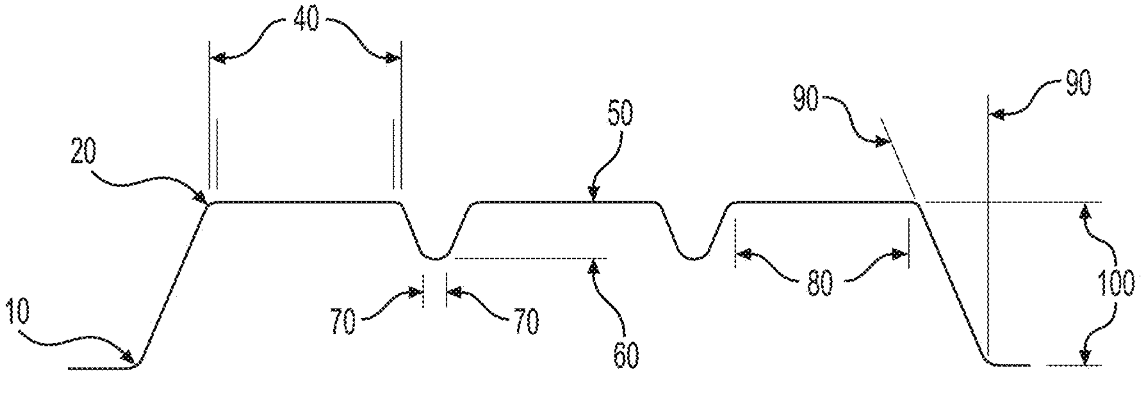
FIG. 4 illustrates a cross-section of the emboss pattern of FIG. 3 at section line A-A.

FIG. 4 illustrates the cross-section at line B-B as seen in FIG. 3. The cross-section B-B illustrates a curvilinear embossing element with a series of discontinuous emboss elements 50, having a length 40 that project from the top of the element. As can be seen in FIG. 4, the curvilinear element has a height 100, between the base 10, which forms one side of embossed sheet, and the top of the emboss element 20, which forms the other side of the sheet. The curvilinear element can extend indefinitely and include as many discontinuous elements 50 as desired to achieve a particular pattern.

The discontinuous elements 50 are separated by a series of debossments of a length 70. The discontinuous elements 50 have a height between the bottom of the debossment, indicated by the line 60, and the top 20 of the elements 50. The elements 50 have a base dimension 80 which provides improved feel as the consumer's hand moves over the linear elements. In the embodiment illustrated, the curvilinear embossing element has a sidewall angle 90, defining the position of the base 10 relative to the discontinuous embossing elements 50.

Figure 5:
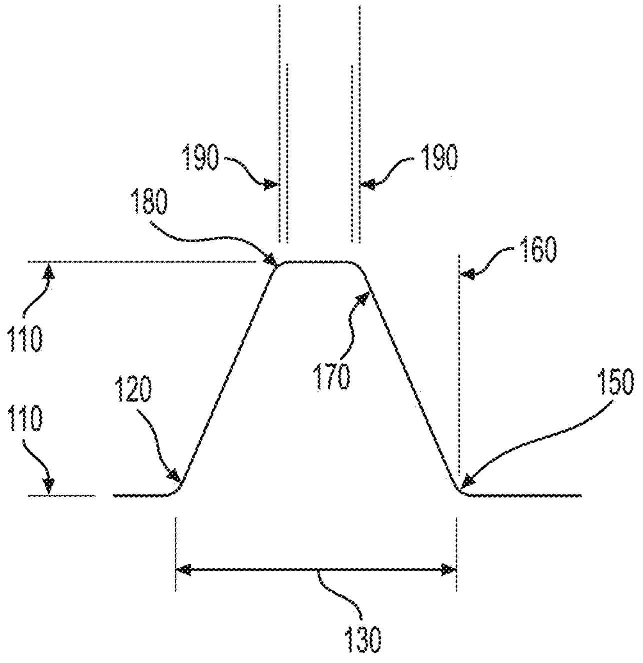
FIG. 5 illustrates a cross-section of the emboss pattern of FIG. 3 at section line B-B.

FIG. 5 illustrates the cross-section at line A-A as seen in FIG. 3. The cross-section A-A illustrates a single curvilinear embossing element including a discontinuous emboss element that projects from the top of the curvilinear element. As can be seen in FIG. 5, the curvilinear element and discontinuous embossing elements have coextensive sidewalls 170. Coextensive sidewalls refers to sidewalls that are continuous from the base to the apex of the element. If the discontinuous embossing element is narrower than the continuous embossing element, the sidewalls would not be coextensive.

As can be seen in FIG. 5, the curvilinear element has a height 110, between the base 120, and the top of the element 180. The embossing elements have a width 130 between the base of the sidewalls 120 and 150. The top of the elements have a width 190, which also defines the width of the discontinuous elements. The elements have a side wall 170 which projects from the base 150 at an angle 160.

Figure 8:
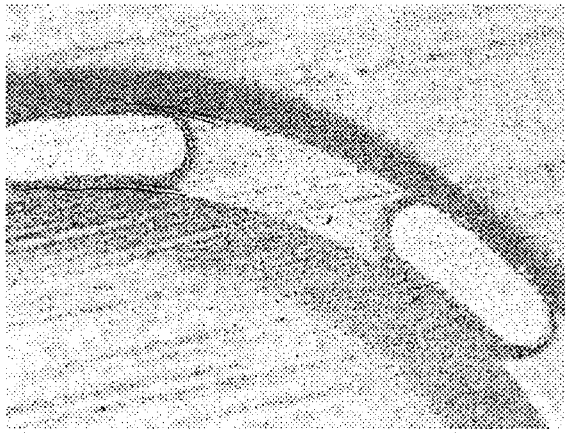
FIG. 8 is a photograph taken of a dash element on a continuous curvilinear linear plateau as described in the instant specification.

The combination of discontinuous embossing elements on a curvilinear embossing element, as described, can be seen in the photograph of FIG. 8. In the photograph, the discontinuous embossing elements have rounded edges and appear as dashes. In the areas between the raised dashes the continuous curvilinear element can be seen.

Further, as seen in FIG. 8, the deformation of the paper sheet along the emboss element is reflected as a darkened area. The deformation of the paper is continuous and linear. This deformation pattern, while providing a distinct dash pattern on the front of the sheet takes advantage of the handfeel associated with the continuous curvilinear element on the reverse of the paper.

Figure 6:
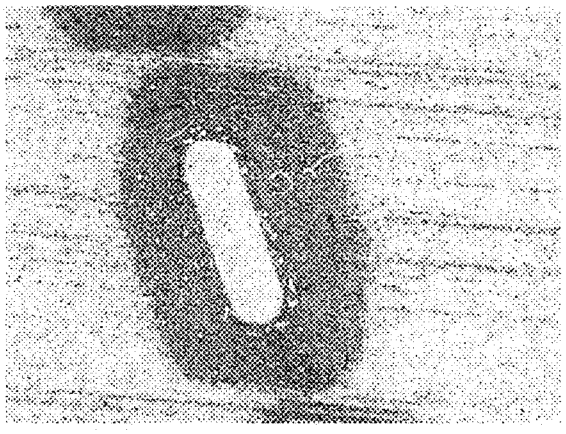
FIG. 6 (Prior Art)
FIG. 6 is a photograph of prior art discrete dash elements embossed in a tissue substrate for comparison.
Figure 7:
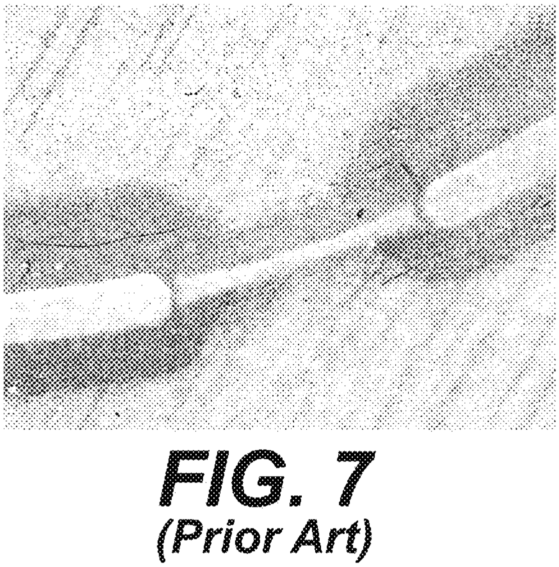
FIG. 7 (Prior Art)
FIG. 7 is a photograph of prior art dash elements separated by partitions as described in U.S. Pat. No. 6,461,720.

By contrast, FIGS. 6 and 7 are photographic representations of dash patterns as described in the prior art. FIG. 6 illustrates a standard dash pattern where each of the dash elements is produced without any interconnection. As the darkened deformation pattern shows, the paper deforms in a circle or oval around the individual element. The product shown in FIG. 6 has a handfeel that is rough.

FIG. 7 is a reproduction of dash elements that are interconnected as described in U.S. Pat. No. 6,461,720. As can be seen in FIG. 7, the darkened deformation pattern illustrates a series of ovals around the dashes with a small darkened area along the interconnects. As with the pattern in FIG. 6, the handfeel of the product is rough and each individual dash is felt on both the front and the rear of the paper product.

The discontinuous emboss elements can take any variety of shapes or sizes, including by way of example, dots, dashes, squares, rectangles, trapazoids, or any other shape the skilled artisan could select.

According to one embodiment, the discontinuous embossing elements have an aspect ratio of from about 1 to about 50, for example, from about 1 to about 40, for example, from about 1 to about 25, for example, from about 1 to about 10, for example, from about 1 to about 5, for example, from about 1 to about 2.5, for example, for example, at least about 1.1, for example, from about 1.1 to about 2.5, for example from about 1.2 to about 2.5.

Embossing depths for the continuous curvilinear emboss elements are generally at least about 0.04 inches, for example, at least about 0.045 inches, for example, at least about 0.05 inches, for example, at least about 0.06 inches, for example, at least about 0.07 inches The embossing depth for the discontinuous embossing elements is preferably as small as possible. The discontinuous emboss element should have a depth sufficient to prevent the application of glue to the areas of the continuous curvilinear element that are intermediate the individual discontinuous emboss elements. According to one embodiment, the elements are embossed to a depth of between about 0.004 inches to about 0.025 inches, for example, from about 0.004 inches to about 0.01 inches, for example, at least about 0.004 inches, for example, less than about 0.025 inches, for example, between about 0.006 inches and about 0.02 inches, for example between about 0.005 inches to about 0.01 inches, for example from about 0.007 inches to about 0.01 inches. The depth of the discontinuous embossing elements corresponds to the height of the debossments that separates the discontinuous elements.

The ratio between the emboss depth of the curvilinear element and the depth of the discontinuous embossing elements is from about 3 to about 19, for example from about 5 to about 18, for example from about 7 to about 18, for example, from about 7 to about 14, for example from about 7 to about 10, for example, from about 5 to about 10. The discontinuous emboss elements should be tall enough to exhibit a dash pattern in the paper product upon embossing, but not so tall as to interfere with the drape of the paper around the curvilinear element or interfere with the gluing process.

The bond area of the emboss patterns as described herein, are from about 1% and about 15%, for example, between about 3% and 10%, for example from about 3% to 8%, for example, from about 3% to 5%.

The emboss pattern as described includes one or more curvilinear elements having a sidewall angle of from about 15° to about 45°, for example, from about 20° to 35°.

While exemplary formation of the base sheet is detailed above, products using any base sheet can benefit from the disclosed invention. The base sheet for use in the present disclosure can be produced by CWP, TAD or other structured tissue formation methods, e.g., eTAD, and can include base sheets that are creped or uncreped, homogeneous or stratified, wet-laid or air-laid and may contain up to 100% non-cellulose fibers.

The tissue product of the present disclosure may be a single-ply product or can have two or more plies. As used in the present disclosure "topmost," "top ply," "front, "frontmost," are interchangeable and refer to the exposed ply of a tissue ribbon that will form the top of the final tissue product. The phrases "backmost," "back," "bottom-ply," bottommost" are interchangeable and refer to the exposed ply on the reverse of the final tissue product.

A multi-ply product can be produced using any art recognized plying method. According to one embodiment, the plies are glued by application of adhesive to the discontinuous embossing elements. According to another embodiment, the adhesive is applied to a subset of the discontinuous embossing elements. According to one embodiment, the adhesive is applied to every other discontinuous embossing element. According to another embodiment, the glue can be applied sparingly to the discontinuous embossing elements in any other selected or random pattern to improve the product flexibility.

Unless otherwise specified, "basis weight", "BWT," "BW," and so forth, refers to the weight of a 3000 square-foot ream of product (basis weight is also expressed in g/m$^2$ or gsm). Likewise, "ream" means a 3000 square-foot ream, unless otherwise specified. TAPPI LAB-CONDITIONS refers to TAPPI T-402 test methods specifying time, temperature and humidity conditions for a sequence of conditioning steps. The product of the present disclosure has a single base sheet basis weight of from about 7 to about 35 lbs/ream. According to one embodiment, the product has a basis weight of from about 9 to about 18 lbs/ream, for example, from about 9 to about 15 lbs/ream, for example, from about 10 to about 14 lbs/ream, for example about 11 to about 13 lbs/ream.

Calipers reported herein are 8-sheet calipers unless otherwise indicated. The sheets are stacked and the caliper measurement taken about the central portion of the stack. Preferably, the test samples are conditioned in an atmosphere of 23°±1.0° C. (73.4°±1.8° F.) at 50% relative humidity for at least about 2 hours and then measured with a Thwing-Albert Model 89-II-JR or Progage Electronic Thickness Tester with 2-in (50.8-mm) diameter anvils, 539±10 grams dead weight load, and 0.231 in./sec descent rate. For finished product testing, each sheet of product to be tested must have the same number of plies as the product is sold. For base sheet testing off of the paper machine reel, single plies are used with eight sheets being selected and stacked together. Specific volume is determined from basis weight and caliper.

The product of the present disclosure has a caliper of from at least about 80 mils/8 sheets to about 300 mils/8 sheets, for example, from about 100 mils/8 sheets to about 250 mils/8 sheets, for example, from about 80 mils/8 sheets to about 200 mils/8 sheets, for example, 100 mils/8 sheets to about 160 mils/8 sheets, for example, 110 mils/8sheets to about 150 mils/8sheets.

Dry tensile strengths (MD and CD), stretch, ratios thereof, break modulus, stress and strain are measured with a standard Instron test device or other suitable elongation tensile tester which may be configured in various ways, typically using 3 or 1 inch wide strips of tissue or towel, conditioned at 50% relative humidity and 23° C. (73.4° F.), with the tensile test run at a crosshead speed of 2 in/min for modulus, 10 in/min for tensile. For purposes of calculating modulus values, inch wide specimens were pulled at 0.5 inches per minute so that a larger number of data points were available. Unless otherwise clear from the context, stretch refers to stretch (elongation) at break. Break modulus is the ratio of peak load to stretch at peak load. Tensile modulus, reported in grams per inch per percent strain, is determined by the same procedure used for tensile strength except that the modulus recorded is the geometric mean of the chord slopes of the cross direction and machine direction load-strain curves from a value of 0 to 100 grams, and a sample width of only one inch is used. GMT refers to the geometric mean tensile strength of the CD and MD tensile. Tensile energy absorption (TEA) is measured in accordance with TAPPI test method T494 om-01

The multi-ply product of the present disclosure has a Geometric Mean Tensile Strength (GMT) of from about 400 to about 4500, for example 600 to about 3500, for example, from about 700 to about 3200, for example, from about 700 to about 2500, for example, from about 750 to about 2500, for example, from about 750 to about 1200, for example, from about 825 to 875.

The multi-ply product of the present disclosure has a roll compression of from about 4% to about 25%, for example, from about 10% to about 20%, for example, from about 13% to about 18%.

The multi-ply product of the present disclosure has a TMI ply bond of at least about 1.5 g, for example from about 1.5 grams to about 40 g, for example at least about 3 g, for example, from about 3 g to about 25 g, for example, from about 1.5 g to about 30 g, for example from about 3 g to about 22 g, for example, from about 6 g to about 15 g. TMI ply bond is measured according to the following procedure.

Ply bond strengths reported herein are determined from the average load required to separate the plies of two-ply tissue, towel, napkin, and facial finished products using TMI Ply Bond Lab Master Slip & Friction tester Model 32-90, with high-sensitivity load measuring option and custom planar top without elevator available from: Testing Machines Inc. 2910 Expressway Drive South Islandia, N.Y. 11722; (800)-678-3221; www.testingmachines.com. Ply Bond clamps are available from: Research Dimensions, 1720 Oakridge Road, Neenah, Wis. 54956, Contact: Glen Winkler, Phone: 920-722-2289 and Fax: 920-725-6874.

Samples are preconditioned according to TAPPI standards and handled only by the edges and corners care being exercised to minimize touching the area of the sample to be tested.

At least ten sheets following the tail seal are discarded. Four samples are cut from the roll thereafter, each having a length equivalent to 2 sheets but the cuts are made ¼" away from the perforation lines by making a first CD cut ¼" before a first perforation and a second CD cut ¼" before the third perforation so that the second perforation remains roughly centered in the sheet. The plies of each specimen are initially separated in the leading edge area before the first perforation continuing to approximately 1 inch past this perforation.

The sample is positioned so that the interior ply faces upwardly, the separated portion of the ply is folded back to a location ½" from the initial cut and ¼" from the first perforation, and creased there. The folded back portion of the top ply is secured in one clamp so that the line contact of the top grip is on the perforation; and the clamp is placed back onto the load cell. The exterior ply of the samples is secured to the platform, aligning the perforation with the line contact of the grip and centering it with the clamp edges.

After ensuring that the sample is aligned with the clamps and perforations, the load-measuring arm is slowly moved to the left at a speed of 25.4 cm/min, for a test length of 16.5 cm and the average load between 5-14 cm on the arm (in g.) is measured and recorded. The average of 3 samples is recorded with the fourth sample being reserved for use in case of damage to one of the first three.

For products having more than two plies follow the same preparation procedure and obtain two samples. Take one sample and test each of the plies starting with the outside ply and removing one sheet at a time until all plies are tested. Each of the individual ply bonds are averaged to obtain the ply bond value in grams. Test the other sample the same way and the average of the two in grams is reported.

According to one embodiment, the multi-ply product of the present disclosure has a saturation capacity of from about 200 to about 700 g/m$^2$, for example, from about 250 to about 650 g/m$^2$, for example from about 300 to about 600 g/m$^2$, for example, from about 350 to about 450 g/m$^2$.

Sensory Softness

Sensory softness of the samples was determined by using a panel of trained human subjects in a test area conditioned to TAPPI standards (temperature of 71.2° F. to 74.8° F., relative humidity of 48% to 52%). The softness evaluation relied on a series of physical references with predetermined softness values that were always available to each trained subject as they conducted the testing. The trained subjects directly compared test samples to the physical references to determine the softness level of the test samples. The trained subjects assigned a number to a particular paper product, with a higher sensory softness number indicating a higher perceived softness.

Subjective product attributes, such as sensory softness, are often best evaluated using test protocols in which a consumer uses and evaluates a product. In a "monadic" test, a consumer will use a single product and evaluate its characteristics using a standard scale. In paired comparison tests, the consumers are given samples of two different products and asked to rate each vis-à-vis the other for either specific attributes or overall preference. Sensory softness is a subjectively measured tactile property that approximates consumer perception of sheet softness in normal use. Softness is usually measured by 20 trained panelists and includes internal comparison among product samples. The results obtained are statistically converted to a useful comparative scale.

The following examples provide representative embodiments. The methods and products described herein should not be limited to the examples provided. Rather, the examples are only representative in nature.

EXAMPLES

Example 1

Three substantially identical two ply products were produced as described herein and each was embossed with a different embossing pattern as seen in FIGS. 6, 7 and 8. The embossing pattern of FIG. 6 is a traditional pattern having a series of dash elements that are separated from one another. The embossing pattern of FIG. 7 is the pattern as seen in the prior art and having narrow connections between the discrete embossing elements. FIG. 8 is an inventive product having the continuous embossing element and the set of discontinuous embossing elements as described in the instant application.

Figure 9:
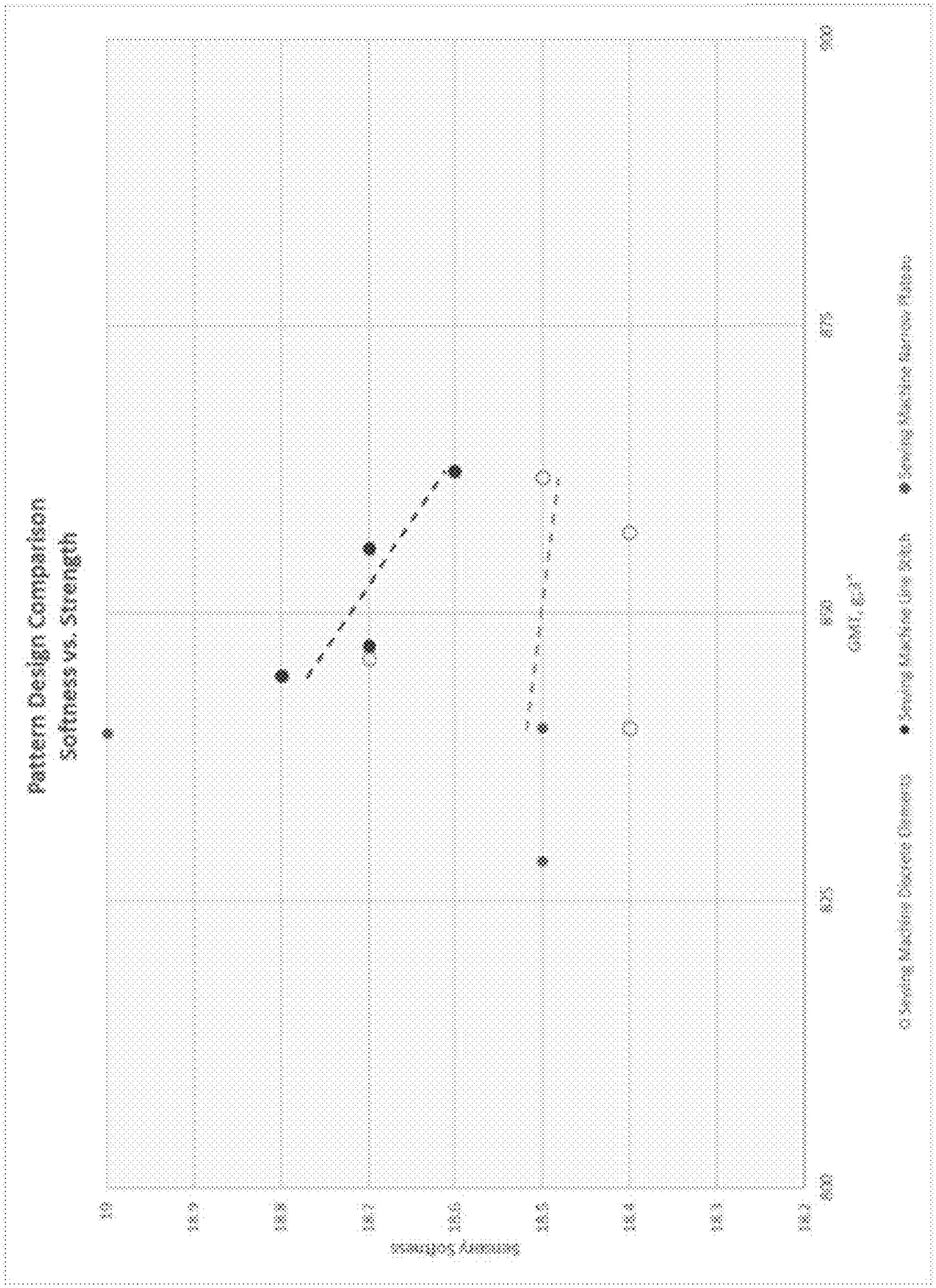
FIG. 9 is a graph of comparative pattern designs of softness versus strength.

The embossed products were compared for softness and strength and the comparative results are set forth in the graph of FIG. 9. As can be seen in the graph, the pattern of FIG. 6, represented by the open circles has comparable strength to the inventive product, but the lowest sensory softness. The pattern as set forth in FIG. 7 having connectors between the emboss elements, represented by the smaller dots, is softer than the original dash pattern, but it is not as strong as the original dash pattern.

By contrast the product of FIG. 8 improved over the original dash pattern and the prior art pattern in both strength and softness.

The discrete stitch pattern of FIG. 6 was also compared to the inventive line plateau stitch pattern of FIG. 8 with respect to "knobbiness." As set forth in the Table below, TMI friction was measured for both the top sheet and the bottom sheet of each multi-ply product. According to the data collected, the inventive product has a significant reduction in friction on the back side. In addition, the inventive product has an increase in friction on the top side of the multi-ply product, thereby recognizing the improved definition found in the claimed product.

TABLE 1

| | TMI Top Sheet Friction GMMMD | TMI Bottom Sheet Friction GMMMD |
|---|---|---|
| Discrete Stitch | 0.714 | 0.729 |
| Line Plateau Stitch | 0.722 | 0.625 |

Example 2

Figure 10:
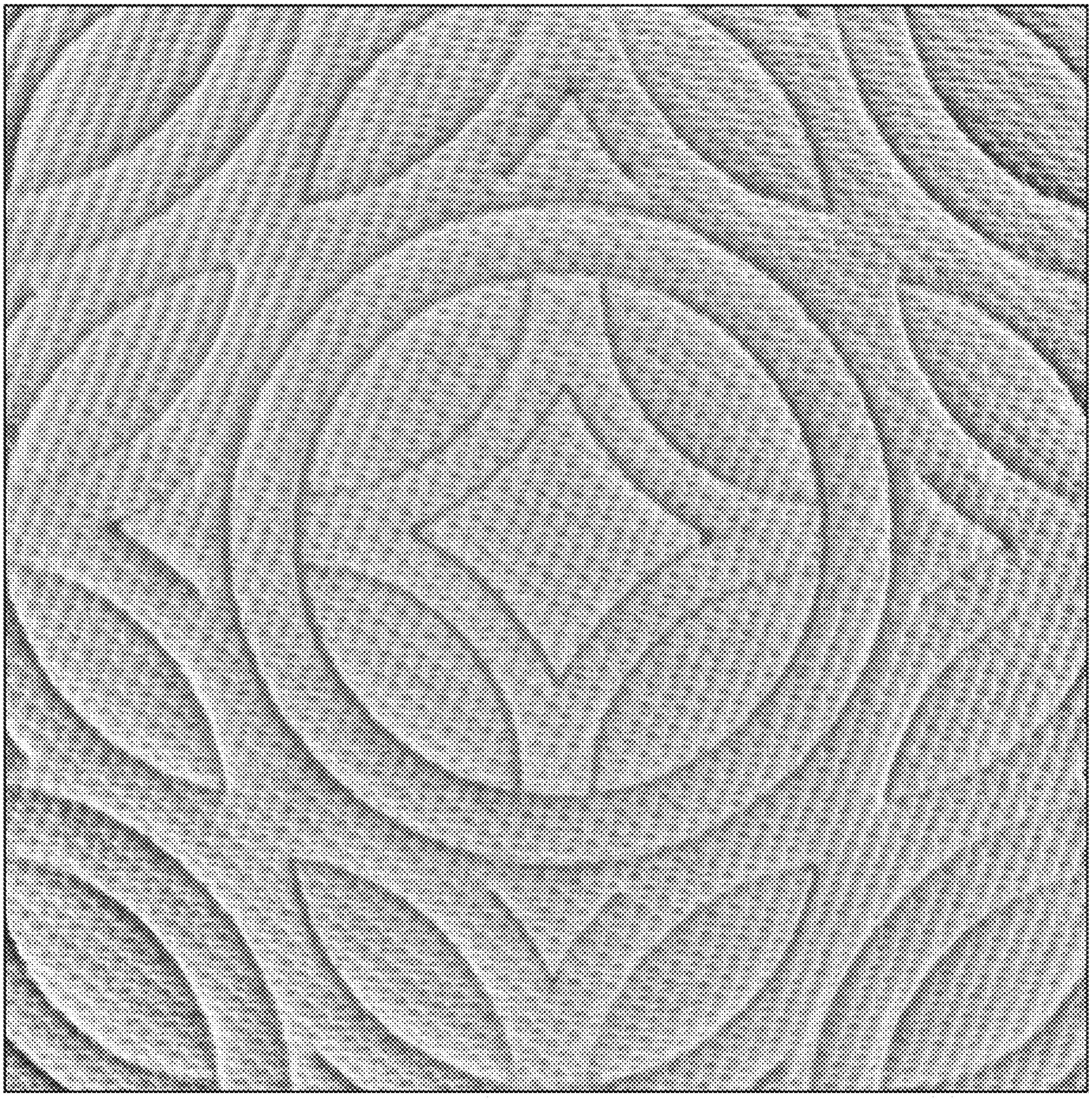
FIG. 10 is a high resolution photograph of a towel bearing a commercial emboss pattern.

A series of towel products was produced from the same base sheet, but bearing different emboss patterns. The products comprised the emboss patterns of FIGS. 10, 11 and 12, respectively. The pattern of FIG. 10 is a current commercially available embodiment made up of continuous line segments. The patterns of FIGS. 11 and 12 are variations of the pattern of FIG. 10 embodying the invention as described in the instant application.

Figure 11:
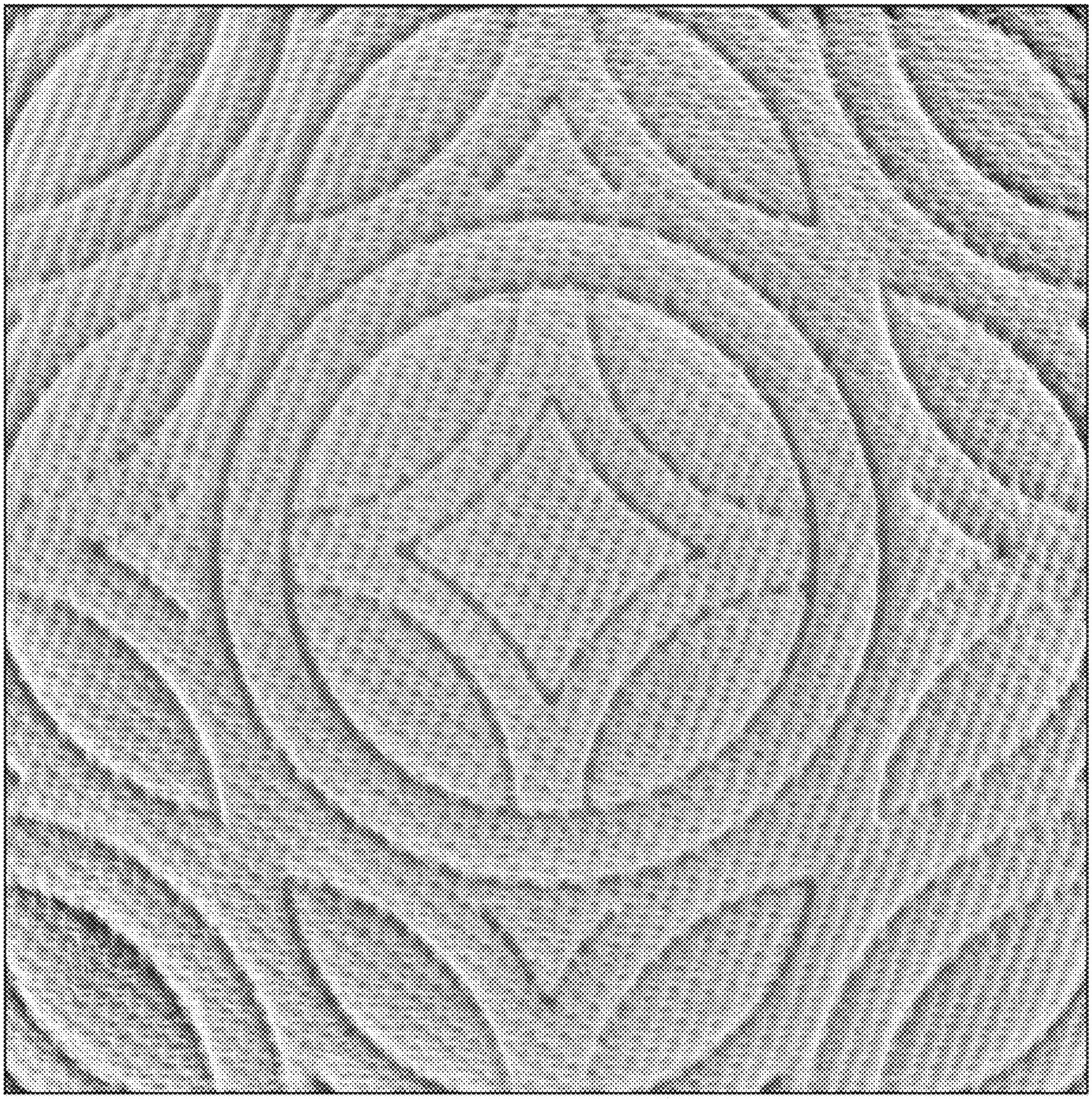
FIG. 11 is a high resolution photograph of a towel bearing an emboss pattern according to another embodiment of the present description.
Figure 12:
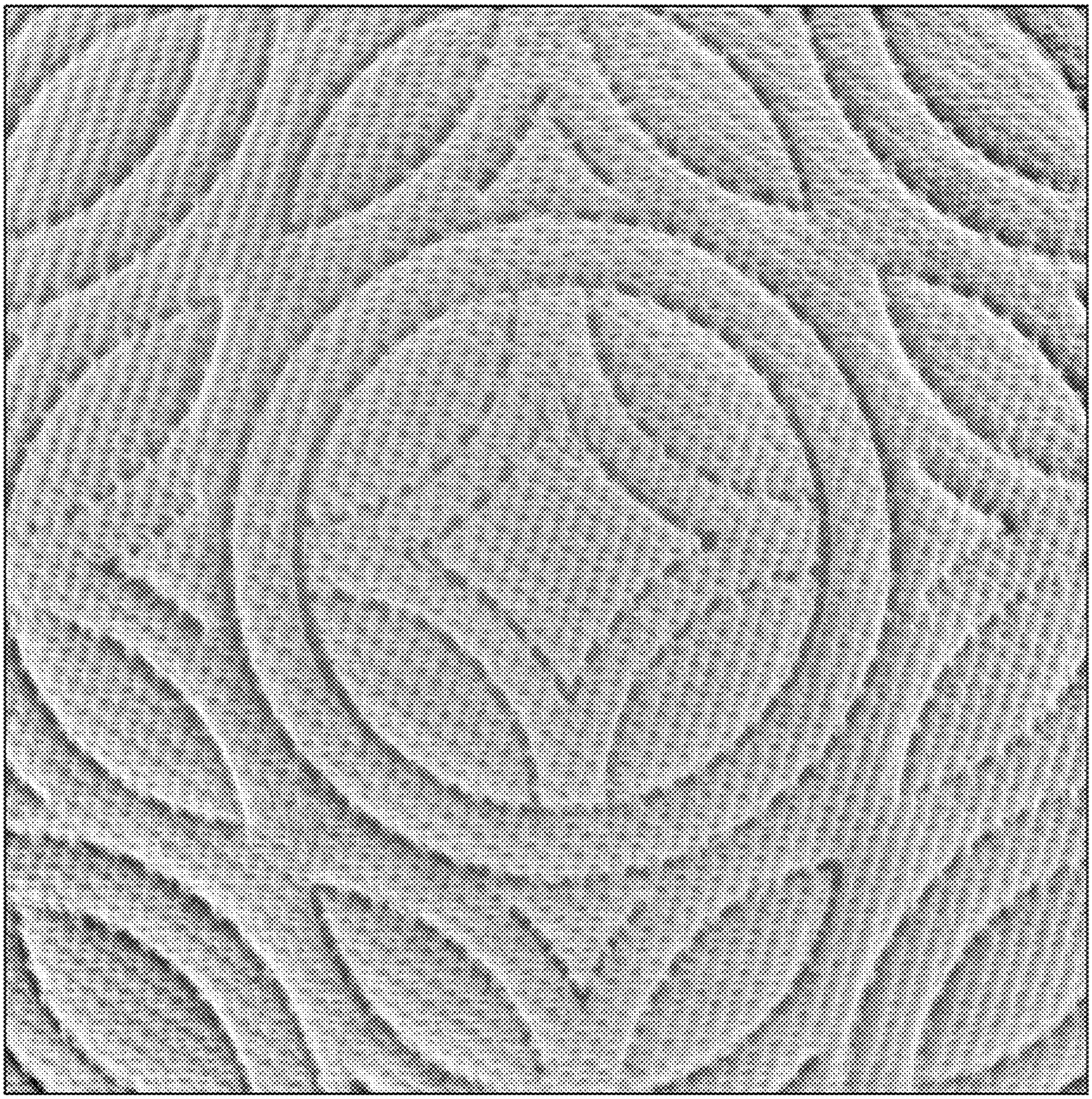
FIG. 12 is a high resolution photograph of a towel bearing an emboss pattern according to yet another embodiment of the present description.
Figure 13:
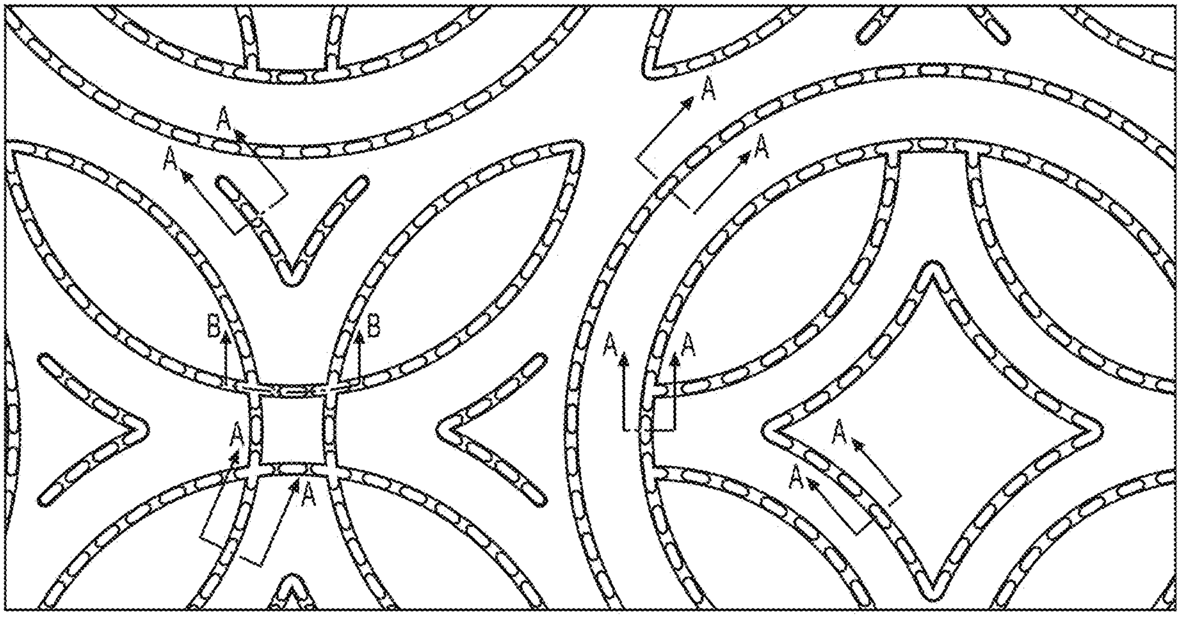
FIG. 13 illustrates a fragment of a stitch-based emboss pattern according to one embodiment of the present description.

A schematic representation of the patterns of both FIGS. 11 and 12 can be seen in FIG. 13. FIG. 13 is an expanded view of the emboss pattern with lines at A-A and B-B showing a cross-section of the emboss element of this embodiment, across the width and along the length of the curvilinear element, respectively. FIGS. 11 and 12 vary in dimension, but not pattern.

Figure 14:
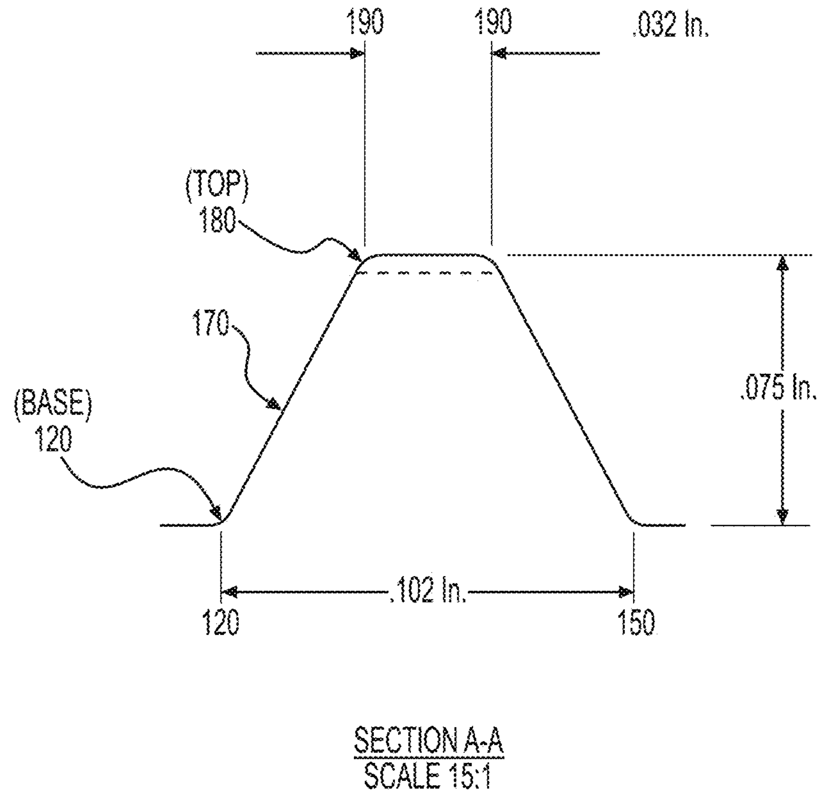
FIG. 14 illustrates a cross-section of the emboss pattern of FIG. 13, as it represents FIG. 11, at section line A-A.

FIG. 14 illustrates the cross-section at line A-A as seen in FIG. 13, representing FIG. 11. The cross-section A-A illustrates a single curvilinear embossing element including a discontinuous emboss element that projects from the top of the curvilinear element. In the embodiment seen in FIG. 14, the curvilinear element and discontinuous embossing elements have coextensive sidewalls 170. Coextensive sidewalls refers to sidewalls that are continuous from the base to the apex of the element.

In the embodiment of FIG. 14, the curvilinear element has a height 0.75 inches, between the base 120, and the top of the element 180. The embossing elements have a width of 0.102 inches between the base of the sidewalls 120 and 150. The top of the elements have a width 190, of 0.32 inches which also defines the width of the discontinuous elements.

Figure 15:
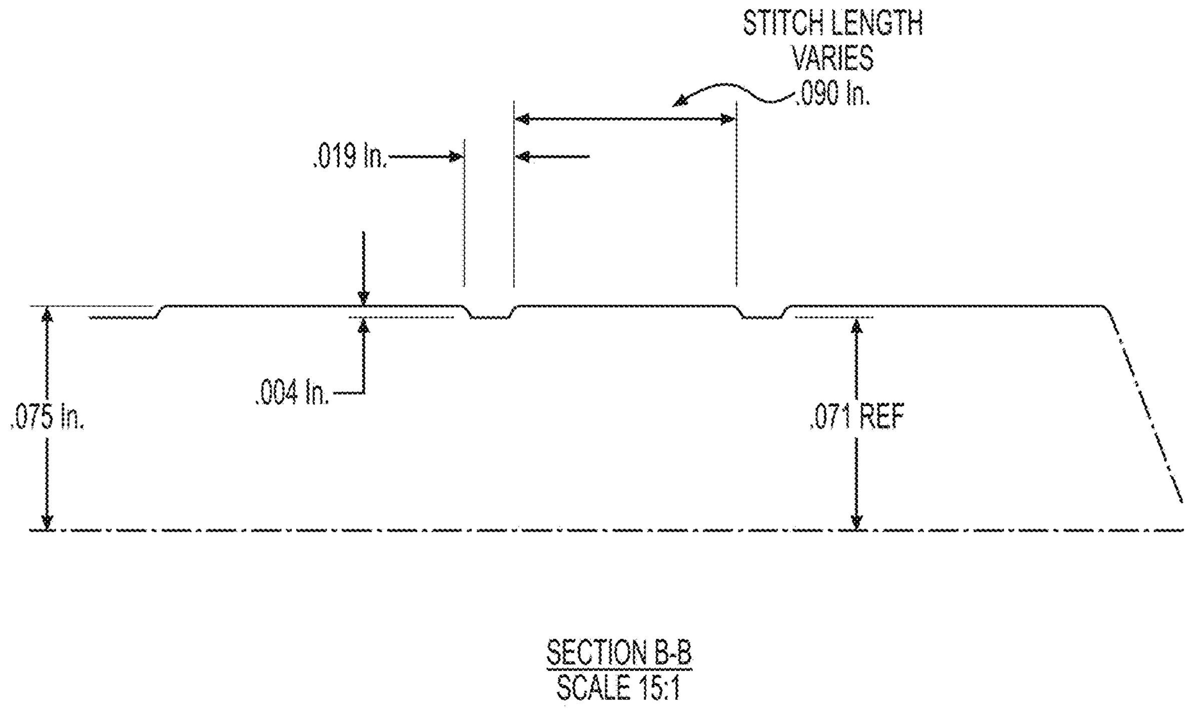
FIG. 15 illustrates a cross-section of the emboss pattern of FIG. 13, as it represents FIG. 11, at section line B-B.

FIG. 15 illustrates the cross-section at line B-B as seen in FIG. 13, representing FIG. 11. The cross-section B-B illustrates a curvilinear embossing element with a series of discontinuous emboss elements that project from the top of the element. As can be seen in the embodiment of FIG. 15, the curvilinear element has a height of 0.75 inches between the base 120 and the top of the emboss element 180. According to this embodiment, the curvilinear element extends indefinitely and includes discontinuous elements that can vary in length but are typically around 0.09 inches.

The discontinuous elements are separated by a series of debossments of a length 0.19 inches. The discontinuous elements have a height between the bottom of the debossment and the top of the elements of 0.004 inches.

Figure 16:
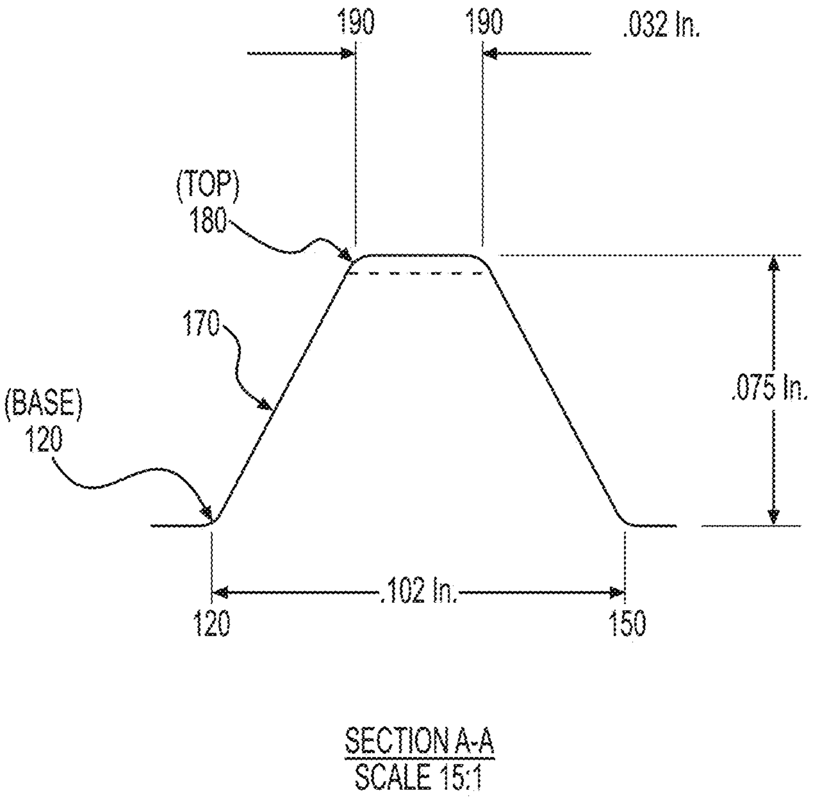
FIG. 16 illustrates a cross-section of the emboss pattern of FIG. 13, as it represents FIG. 12, at section line A-A.

FIG. 16 illustrates the cross-section at line A-A as seen in FIG. 13, representing FIG. 12. As in the embodiment of FIG. 14, the cross-section A-A illustrates a single curvilinear embossing element including a discontinuous emboss element that projects from the top of the curvilinear element. In the embodiment of FIG. 16, the curvilinear element and discontinuous embossing elements are again coextensive sidewalls 170.

In the embodiment of FIG. 16 as in the embodiment of FIG. 14, the curvilinear element has a height 0.75 inches, between the base 120, and the top of the element 180. The embossing elements have a width of 0.102 inches between the base of the sidewalls 120 and 150. The top of the elements have a width 190, of 0.32 inches which also defines the width of the discontinuous elements.

Figure 17:
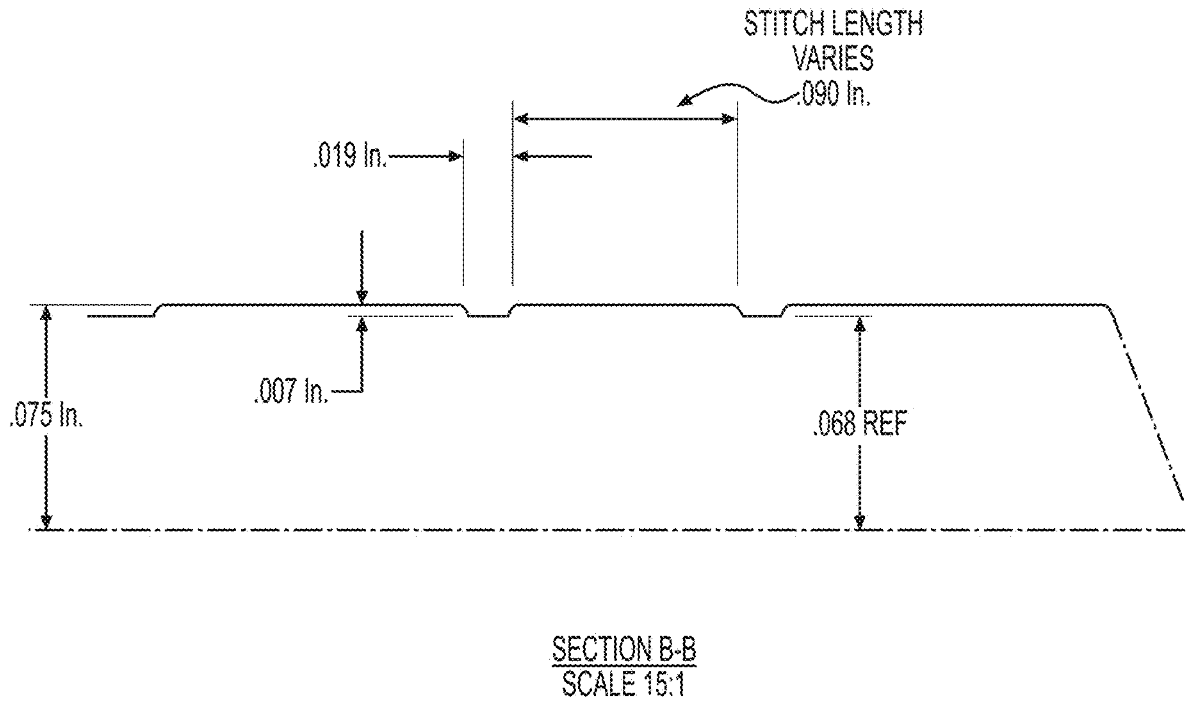
FIG. 17, as it represents

FIG. 17 illustrates the cross-section at line B-B as seen in FIG. 13, representing FIG. 12. The embodiment of FIG. 17 differs from the embodiment of FIG. 15 by the height of the discontinuous elements between the bottom of the debossment 120 and the top of the elements, 180. In the instant embodiment, the height is 0.007 inches.

As can be seen in FIGS. 11 and 12, the product of FIG. 12 having a discontinuous element height of 0.007 inches resulted in a more noticeable stitch pattern in the finished product.

The product attributes of the finished products are set forth in Table 2, below.

TABLE 2

| | Control | | Cell #1 | | | Cell #2 | | |
|---|---|---|---|---|---|---|---|---|
| | Emboss Roll Nip (in) | | | | | | | |
| | 1.5 | | 1.75 | | | 1.75 | | |
| | Marrying Roll Nip (in) | | | | | | | |
| | 0.75 | | 0.88 | | | 0.75 | | |
| Attribute | Base Sheet x2 | FIG. 10 | Base Sheet x2 | FIG. 11 | FIG. 12 | Base Sheet x2 | FIG. 11 | FIG. 12 |
| Basis Weight (lb/R) | 31.0 | 31.0 | 31.4 | 31.1 | 31.1 | 31.5 | 31.0 | 31.0 |
| Caliper (mils/8-sheets) | 198.0 | 188.8 | 224.7 | 187.1 | 188.5 | 223.6 | 184.8 | 185.4 |
| SAT (gsm) | 552 | 554 | 640 | 561 | 545 | 584 | 546 | 539 |
| GM Tensile (g/3") | 3134 | 3367 | 3324 | 3320 | 3191 | 3359 | 3126 | 3103 |
| CD Wet Tensile (g/3") | 889 | 842 | 932 | 803 | 778 | 941 | 755 | 768 |
| Ply Bond Strength (g) | n/a | 14.1 | n/a | 11.4 | 15.2 | n/a | 13.6 | 10.0 |
| Softness (PSU) | n/a | 5.0 | n/a | 5.0 | 5.0 | n/a | 5.0 | 5.0 |

Table 2 shows that the basis weight, caliper and SAT capacity are consistent among all the finished products. The GM Tensile varies between 3103 and 3367 g/3 inches and the CD Wet Tensile varies between 755 and 842 g/3 inches. Given these variations, the expectation was that the product softness would be materially affected. Surprisingly, the softness values of the finished products were all on the order of 5.0.

The impact of the pattern changes were further evaluated as a percentage change from a two ply unembossed base sheet. The results are shown in Table 3, below.

TABLE 3

| Attribute | Control Converting Impact (%) | Cell 1 Converting Impact (%) | Cell 1 Converting Impact (%) | Cell 2 Converting Impact (%) | Cell 2 Converting Impact (%) |
|---|---|---|---|---|---|
| Emboss Pattern | Control | FIG. 11 | FIG. 12 | FIG. 11 | FIG. 12 |
| Basis Weight (lb/R) | 0.1 | −0.9 | −0.9 | −1.4 | −1.5 |
| Caliper (mils/8-sheets) | −4.7 | −16.7 | −16.1 | −17.3 | −17.1 |
| SAT (gsm) | 0.3 | −12.4 | −14.8 | −6.5 | −7.7 |
| GM Tensile (g/3") | 7.4 | −0.1 | −4.0 | −6.9 | −7.6 |
| CD Wet Tensile (g/3") | −5.2 | −13.8 | −16.5 | −19.7 | −18.4 |

As can be seen in Table 3, the emboss patterns as described in the present disclosure provide reductions in both GM Tensile and Wet Tensile. The reduction in GM Tensile improves product softness. As this product was made with a chemical debonder, the reduction in Wet Tensile improves chemical costs as less debonder may be needed to achieve an appropriate target Wet Tensile.

To better understand the changes to the GM Tensile strength, the products of FIGS. 10-12 were produced using ultraviolet lamination glue. A visual comparison of the products was made by spraying them with a PVOH indicator. The results can be seen in FIGS. 18-20, respectively.

Figure 18:
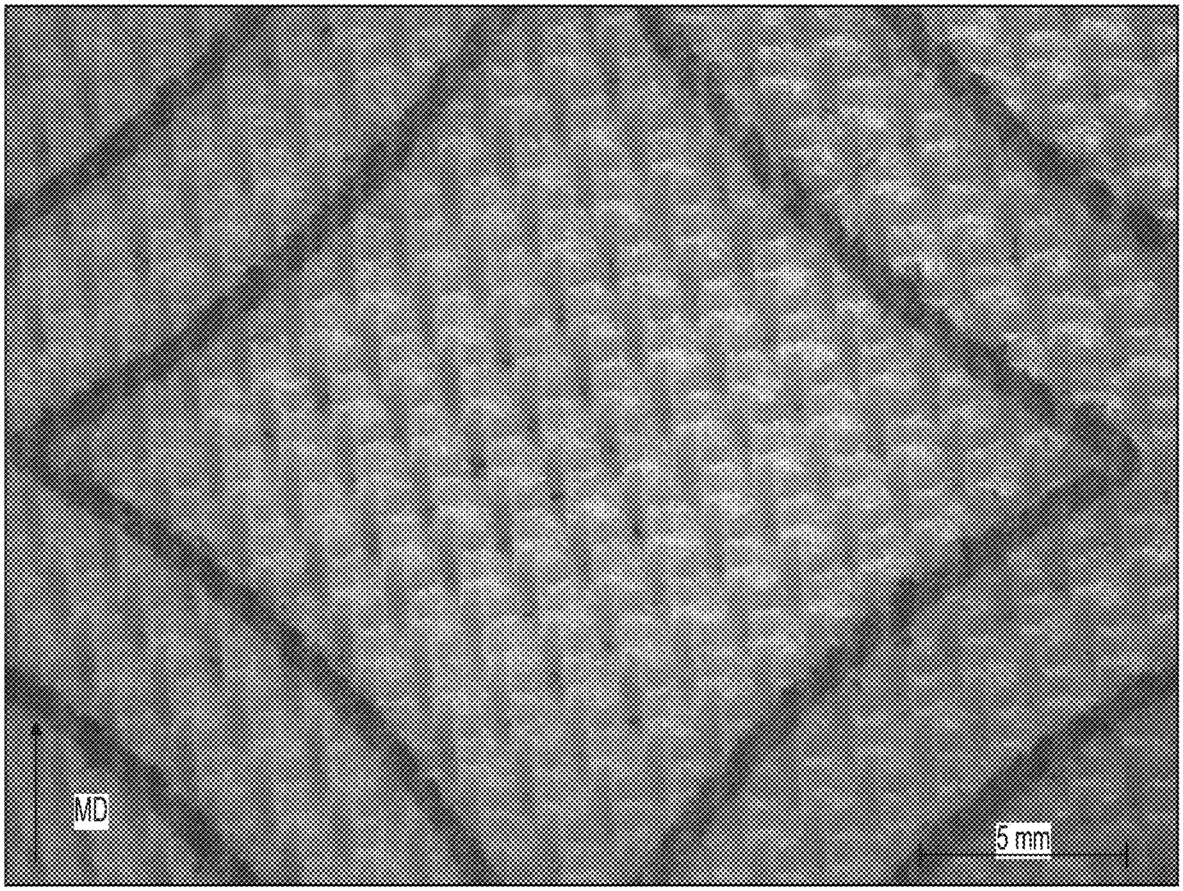
FIG. 18 is a high resolution photograph of the towel of FIG. 10 after the application of adhesive that has been rendered blue, appearing grayscale in the photograph.
Figure 19:
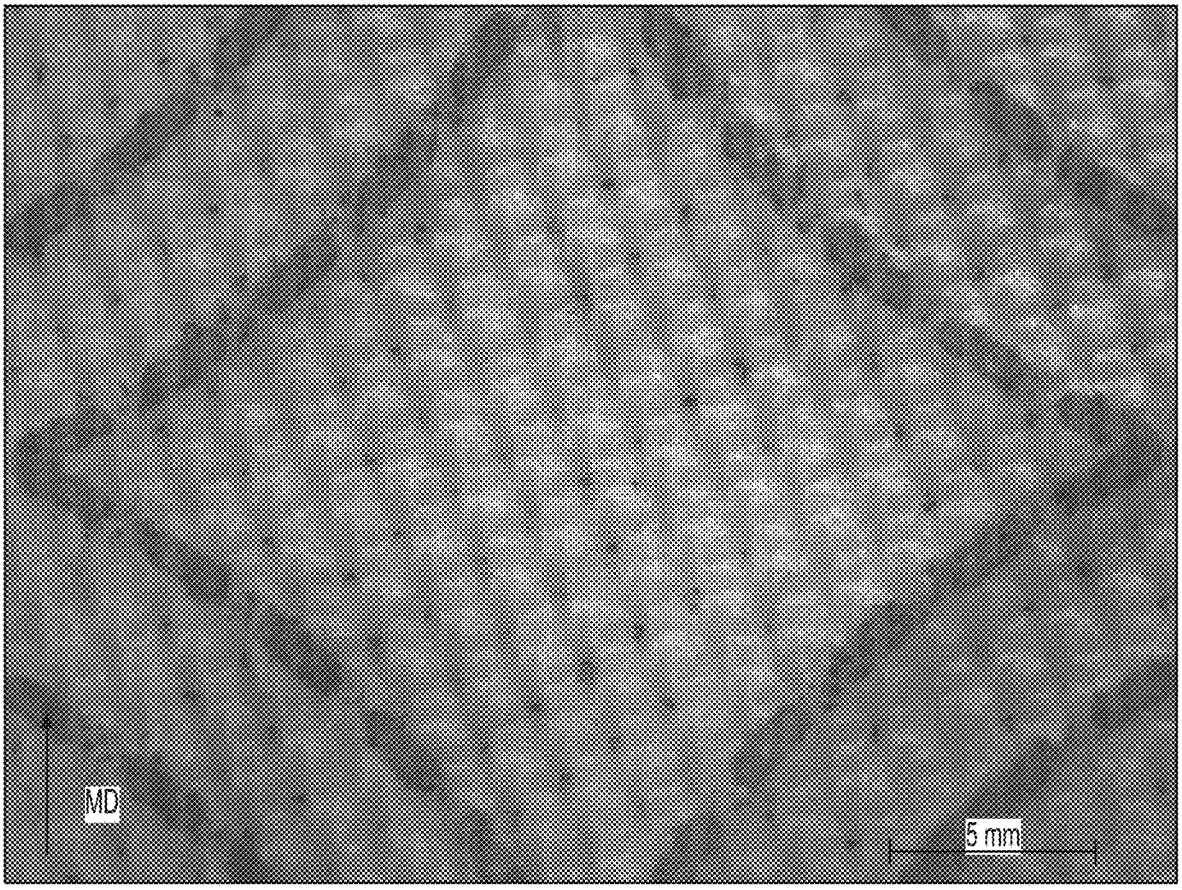
FIG. 19 is a high resolution photograph of the towel of FIG. 11 after the application of adhesive that has been rendered blue, appearing grayscale in the photograph.
Figure 20:
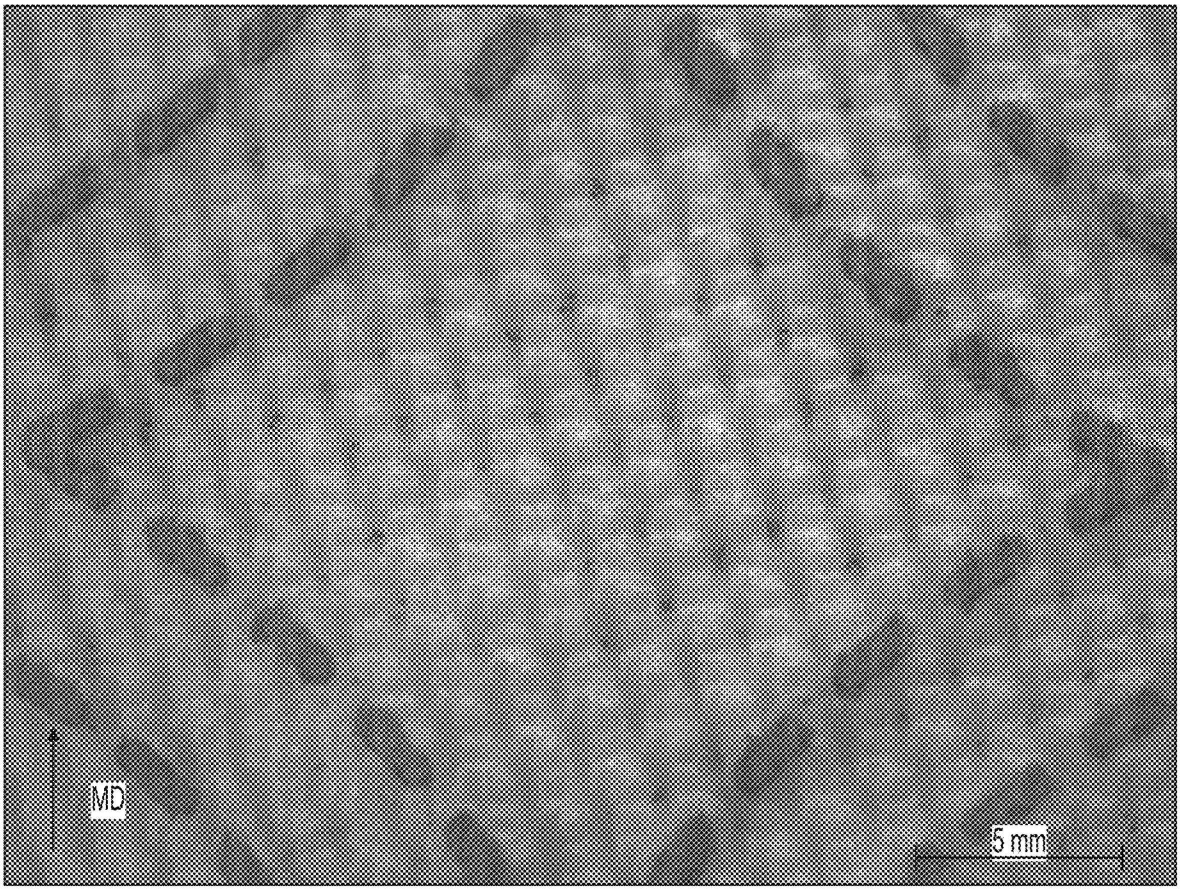
FIG. 20 is a high resolution photograph of the towel of FIG. 12 after the application of adhesive that has been rendered blue, appearing grayscale in the photograph.

FIGS. 18, 19 and 20, are photographic representations that show the application of adhesive to the patterns of FIGS. 10, 11 and 12, respectively. As can be seen in FIG. 18, the adhesive is carried by the continuous emboss element. As FIGS. 19 and 20 show, the adhesive is carried by the discontinuous elements thereby reducing the amount of adhesive needed to achieve appropriate ply bonding. The reduction in adhesive is believed to be responsible for the significant improvement in GM Tensile seen in the finished products utilizing the embossing pattern as described in the instant disclosure. While the level of the adhesive may be reduced the handfeel associated with the linear elements is retained.

Although the present disclosure has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive and the scope of the invention to be determined by any claims supportable by this application and the equivalents thereof, rather than by the foregoing description.

What is claimed is:

1. A multi-ply paper product comprising;

at least two tissue plies;

wherein one tissue ply is a top sheet having an outside surface constituting a top surface of the product and an opposing inside surface facing the interior of the product;

wherein one tissue ply constitutes a bottom sheet having an outside surface constituting a bottom surface of the product;

wherein the tissue ply constituting the top sheet comprises an emboss pattern protruding towards the interior of the product comprising, at least one continuous linear or curvilinear emboss element having a long dimension and a short dimension;

the at least one continuous emboss element having a base and a top, wherein the height of the at least one continuous linear or curvilinear emboss element is measured from the base to the top, and the length and width are measured across the base in the long dimension and the short dimension, respectively;

a set of discontinuous emboss elements that project upward from the top of the at least one continuous linear or curvilinear emboss element, wherein the width of the discontinuous emboss elements are coextensive with the width of the at least one continuous linear or curvilinear emboss element; and wherein the coefficient of friction of the top surface of the product is greater than the coefficient of friction of the bottom surface of the product.

2. The multi-ply paper product of claim 1, wherein the discontinuous emboss elements in the set are dots or dashes.

3. The multi-ply paper product of claim 1, wherein the discontinuous emboss elements in the set are dots or dashes and have an aspect ratio of at least 1.1.

4. The multi-ply paper product of claim 1, wherein the discontinuous emboss elements in the set are separated by a series of debossments.

5. The multi-ply paper product of claim 4, wherein the series of debossments have a height of from about 0.004 to about 0.025 inches.

6. The multi-ply paper product of claim 1, wherein the ratio between the depth of emboss of the at least one continuous linear or curvilinear emboss element and the depth of emboss of the discontinuous emboss elements in the set is from about 2 to about 5.

7. The multi-ply paper product of claim 1, wherein the tissue ply constituting the top sheet is bonded to another tissue ply by adhesive applied along the top of a plurality of the discontinuous emboss elements in the set.

8. The multi-ply paper product of claim 1, wherein the product is a two-ply product and wherein the tissue ply constituting the top sheet is bonded to the tissue ply constituting the bottom sheet by adhesive applied along the top of a plurality of the discontinuous emboss elements in the set.

9. The multi-ply paper product of claim 1, wherein the adhesive is applied to less than all of the discontinuous emboss elements in the set.

10. The multi-ply paper product of claim 1, wherein the at least one continuous linear or curvilinear emboss element appears as a series of discontinuous emboss elements when viewed from the top surface of the product.

11. The multi-ply paper product of claim 1, wherein the product is a two-ply paper product.

12. The multi-ply paper product of claim 1, wherein the product is a rolled paper product.

13. The multi-ply paper product of claim 1, wherein the product is a two-ply, rolled paper product.

14. The multi-ply paper product of claim 1, wherein the product is a paper towel product.

15. The multi-ply paper product of claim 1, wherein the product is a toilet tissue product.

16. The multi-ply paper product of claim 1, wherein the product is a two-ply, rolled toilet tissue product;

wherein the tissue ply constituting the top sheet is bonded to the tissue ply constituting the bottom sheet by adhesive applied along the top of a plurality of the discontinuous emboss elements in the set; and wherein the at least one continuous linear or curvilinear emboss element appears as a series of discrete emboss elements when viewed from the top surface of the product.

* * * * *